US006950842B2

(12) United States Patent
Lis

(10) Patent No.: US 6,950,842 B2
(45) Date of Patent: Sep. 27, 2005

(54) ECHO CANCELLER HAVING AN ADAPTIVE FILTER WITH A DYNAMICALLY ADJUSTABLE STEP SIZE

(75) Inventor: Fabian Lis, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 663 days.

(21) Appl. No.: 10/055,447

(22) Filed: Jan. 23, 2002

(65) Prior Publication Data

US 2003/0140075 A1 Jul. 24, 2003

(51) Int. Cl.[7] .............................................. G06F 17/10
(52) U.S. Cl. .................................... 708/322; 379/406.8
(58) Field of Search ................................ 708/310, 314, 708/322, 323; 379/406.08, 406.09

(56) References Cited

U.S. PATENT DOCUMENTS

| | | | | |
|---|---|---|---|---|
| 4,977,591 A | * 12/1990 | Chen et al. | .............. | 379/406.1 |
| 6,219,418 B1 | 4/2001 | Eriksson et al. | | |
| 6,223,194 B1 | 4/2001 | Koike | | |
| 6,259,680 B1 | 7/2001 | Blackwell et al. | | |
| 6,570,896 B2 | * 5/2003 | Bissinger et al. | ........ | 372/38.02 |
| 6,694,019 B1 | * 2/2004 | Song | ..................... | 379/406.04 |

OTHER PUBLICATIONS

Simon Haykin, *Adaptive Filter Theory, 3rd Edition*, 1996, pp. 4–5.
Simon Haykin, *Adaptive Filter Theory*, 1986, pp. 1–43 and 195–219.

* cited by examiner

*Primary Examiner*—Chuong D Ngo
(74) *Attorney, Agent, or Firm*—Gauthier & Connors LLP

(57) ABSTRACT

The present invention is directed to an echo canceller adapted for use in a communication system that includes a hybrid circuit. The echo canceller comprises an adaptive digital filter that generates an estimated echo signal $\hat{z}[k]$ in response to: (i) a sampled input data sequence x[k] and (ii) an error signal sequence e[k] indicative of the difference between a near end signal sequence y[k] and the estimated echo signal $\hat{z}[k]$. The adaptive digital filter computes filter coefficients based upon the error signal sequence e[k] using a stochastic quadratic descent estimator, such as for example a least mean square (LMS) estimator, that employs a dynamically adjustable step size vector $\underline{\mu}[k]$. The adaptive digital filter computes the dynamically adjustable step size vector $\underline{\mu}[k]$ of the form $$\underline{\mu}[k+1] = \underline{\mu}[k] + \alpha\,\underline{\phi}[k]\cdot\underline{x}[k]e[k]\,|_{\mu_{min}}^{\mu_{max}},$$

where $\underline{\phi}[k+1]=\underline{\phi}[k]\bullet(\underline{1}-\underline{\mu}[k]\bullet\underline{x}^2[k])+e[k])+e[k]\underline{x}[k]$ and $\alpha$ is a scalar. In an open loop embodiment, the dynamically adjustable step size vector $\underline{\mu}[k]$ equals to $\underline{\mu}[k]=\mu[k]\underline{1}$, that is, all elements of the vector take the same value collapsing to the particular case of a scalar. The step size is computed using an expression of the form $\mu[k+1]=\mu[k]+\xi[k]$, where $\xi[k]$ is an empirically derived set of values.

5 Claims, 4 Drawing Sheets

ECHO CANCELLER HAVING AN ADAPTIVE FILTER WITH A DYNAMICALLY ADJUSTABLE STEP SIZE

BACKGROUND OF THE INVENTION

The present invention relates to the field of echo cancellers, and in particular to an echo canceller that includes an adaptive filter that employs a dynamically adjustable step size.

As known, bothersome echoes occur in communication systems, such as telephone systems, that operate over long distances or in systems that employ long processing delays, such as digital cellular systems. The echoes are the result of electric leakage in the four-to-two/two-to-four wire hybrid circuit, due to an impedance mismatch in the hybrid circuit between the local loop wire and the balance network. To reduce the echoes, communication systems typically include one or more echo cancellers.

FIG. 1 is a block diagram illustration of a communication system 10 that connects at least two subscribers 12, 14. The first subscriber 12 is typically connected to the communication system 10 via a two-wire line 16 and a hybrid circuit 18. The hybrid circuit 18 connects the two-wire line 16 to the four-wire lines 20, 22. The first four-wire line 20 provides a signal to the second subscriber via a second hybrid circuit 24 and a two-wire line 26. Similarly, signals from the second subscriber 14 are routed to the first subscriber 12 over the two-wire line 26, the second hybrid circuit 24 and the four-wire line 20, 22. In one application, the hybrid circuits may be located in the telephone company central offices. To reduce the echo signals coupled by the hybrid circuit due to impedance mismatches, echo cancellers 30, 32 are included to attenuate the undesirable echoes.

Echo cancellers typically include an adaptive filter that generates an estimate of the echo and subtracts the estimate from the return signal. Like any adaptive discrete time filter, the tap weights of the filter are adjusted based upon the difference between the estimate of the echo signal and the return signal. The adaptive filter employs an adaptive control algorithm to adjust the tap weights in order to drive the value of the difference signal to zero or a minimum value.

A problem with prior art echo cancellers is the relatively long time it takes for the adaptive control algorithm to adapt the filter tap weights in order to drive the error signal value to zero. This is often referred to as speed of convergence. A widely used technique for adapting the tap weights is referred to as the least-mean-square (LMS) algorithm. Advantageously, the LMS algorithm is relatively easy to implement since it does not require measurements of the pertinent correlation functions, nor does it require matrix inversions. In order to decrease the amount of time it takes to drive the difference signal to zero, the adaptive control algorithm may adjust the step size $\mu$ used in the LMS algorithm to a larger value. Although using a relatively large fixed step size $\mu$ facilitates a rapid convergence, the large step size results in a relatively large residual error following convergence. As a trade-off between rapid convergence and a small residual error, some systems have employed a relatively large step size initially and then switch to a smaller predetermined step size as a function of sample count (i.e., time). This approach takes advantage of the improved speed of convergence associated with the initial large step size value, and the relatively small residual error associated with the smaller step size value.

Another problem with prior art echo cancellers has been the relatively large computational burden associated with the echo cancellers. In a digital signal processor embodiment (DSP), the echo canceller requires a relatively large percentage of the DSP's available processing power (e.g., MIPS). Similarly, in an application specific integrated circuit (ASIC) embodiment the relatively large computational burden leads to the use of a large number of gates to implement the echo canceller.

U.S. Pat. No. 6,223,194 entitled "Adaptive Filter, Step Size Control Method Thereof, and Record Medium Therefor" discloses various embodiments for adjusting the step size. However, a problem with the techniques and embodiments set forth in U.S. Pat. No. 6,223,194 is that they require a divide operation in order to compute the step size. Divide operations are undesirable in both DSP embodiments and ASIC embodiments of echo cancellers. Other embodiments disclosed in U.S. Pat. No. 6,223,194 are also computationally inefficient due to their need to compute square roots and vector norms.

Therefore, there is a need for an improved technique for dynamically adjusting the step size $\mu$ in an echo canceller having an adaptive filter that employs a stochastic quadratic descent algorithm such as LMS.

SUMMARY OF THE INVENTION

Briefly, according to an aspect of the invention, an echo canceller adapted for use in a communication system includes a hybrid circuit that comprises an adaptive digital filter. The adaptive filter generates an estimated echo signal $\hat{z}[k]$ in response to: (i) a sampled input data sequence x[k] and (ii) an error signal sequence e[k] indicative of the difference between a near end signal sequence y[k] and the estimated echo signal $\hat{z}[k]$. The adaptive digital filter computes filter coefficients based upon the error signal sequence e[k] using a stochastic quadratic descent estimator that employs a dynamically adjustable step size vector $\underline{\mu}[k]$. The adaptive digital filter computes the dynamically adjustable step size vector $\underline{\mu}[k]$ of the form $\underline{\mu}[k+1]=\underline{\mu}[k]+\alpha\underline{\phi}[k]\bullet\underline{x}[k]e[k]$. In one embodiment, the vector $\underline{\phi}[k]$ is updated according to the relationship $\underline{\phi}[k+1]=\underline{\phi}[k]\bullet(\underline{1}-\underline{\alpha}[k]\bullet\underline{x}^2[k])+\underline{x}[k]e[k]$, where $\alpha$ is a small positive scalar and the vectors are defined as $\underline{u}[k]=[u_1[k], u_2[k], \ldots, u_N[k]]^T$ and $\underline{A}\bullet\underline{B}$ denotes the dot product between vectors $\underline{A}$ and $\underline{B}$.

Briefly, according to another aspect of the present invention, an echo canceller adapted for use in a communication system that includes a hybrid circuit comprises an adaptive digital filter. The adaptive filter generates an estimated echo signal $\hat{z}[k]$ in response to: (i) a sampled input data sequence x[k] and (ii) an error signal sequence e[k] indicative of the difference between a near end signal sequence y[k] and the estimated echo signal $\hat{z}[k]$. The adaptive digital filter computes filter coefficients based upon the error signal sequence e[k] using a stochastic quadratic descent estimator that employs a dynamically adjustable step size vector $\underline{\mu}[k]$. The adaptive digital filter computes the dynamically adjustable step size dynamically adjustable step size vector $\underline{\mu}[k]$, where $\xi[k]$ is an empirically derived set of values In a preferred embodiment the stochastic quadratic descent estimator includes an LMS estimator that employs a dynamically adjustable step size vector $\underline{\mu}[k]$.

The closed loop and open loop computational techniques of the present invention provide a computationally efficient technique for dynamically adjusting the step size of the adaptive filter, with good speed of convergence.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
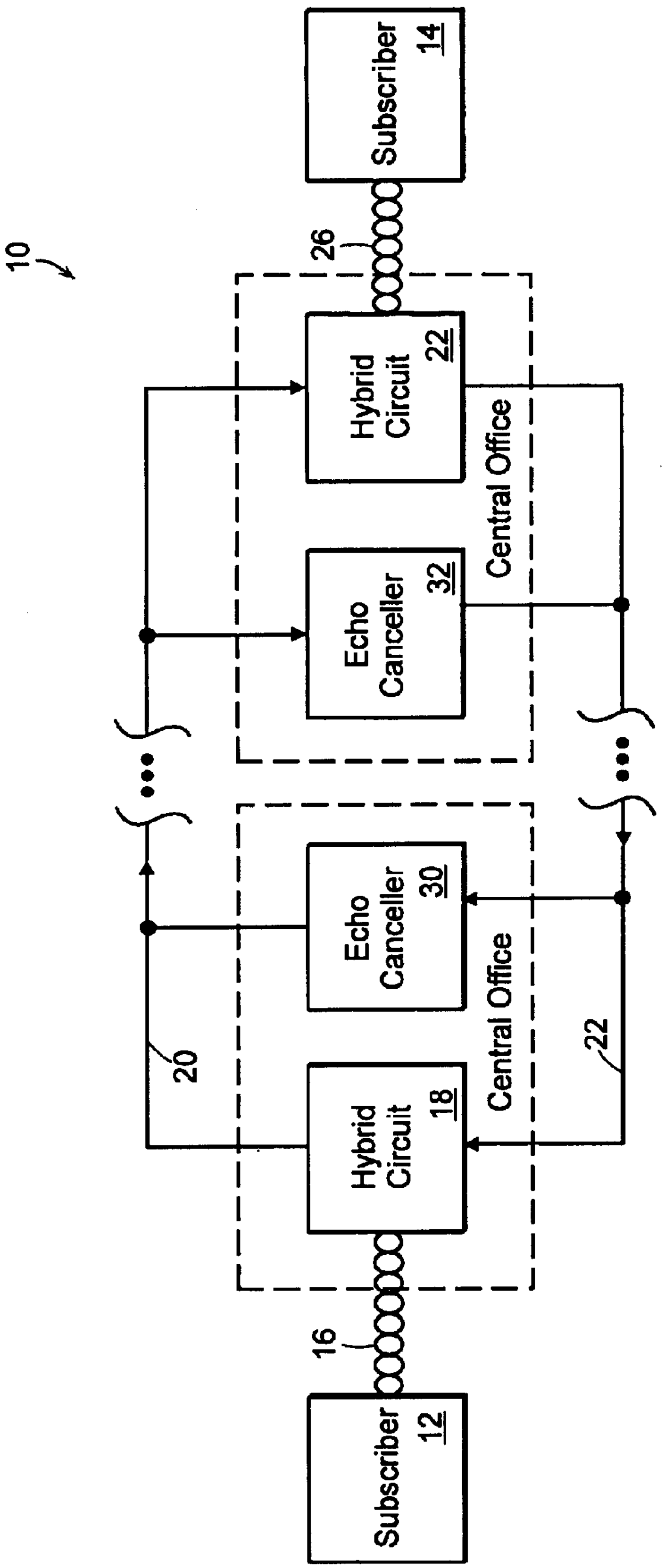
FIG. 1 is a block diagram illustration of a communication system that includes an echo canceller.
Figure 2:
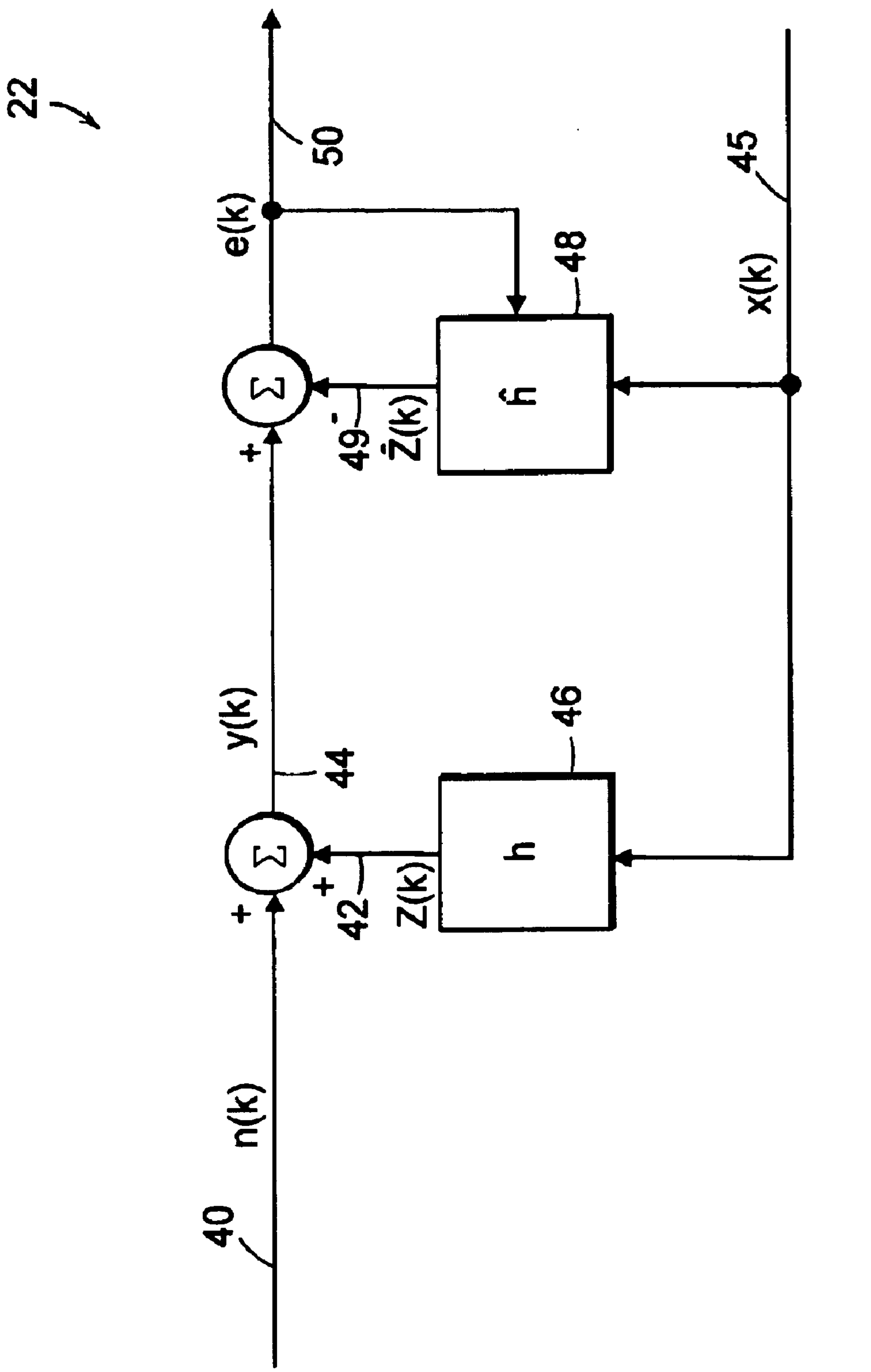
FIG. 2 is a block diagram illustration of an echo canceller.

FIG. 2 is a functional block diagram illustration of an echo canceller 22. The echo canceller 22 receives a near end input signal sequence n[k] on a line 40, and due to the undesirable impedance mismatch of the hybrid circuit, an echo signal sequence z[k] on a line 42 is coupled to the near end input signal sequence n[k] to provide a signal sequence y[k] on a line 44. The echo signal sequence z[k] on the line 42 is equal to the product of the far end transmit signal sequence x[k] on a line 45 and hybrid circuit impulse response h 46 (i.e., $z[k]=\underline{h}^T[k]\underline{x}[k]$). Significantly, the echo canceller 22 includes an adaptive filter 48 that provides a estimated echo signal sequence $\hat{z}[k]$ on a line 49. A difference signal e[k] indicative of the difference between the signal sequence y[k] and the estimated echo signal sequence $\hat{z}[k]$ is computed and provided on a line 50.

Ideally, if the coefficients of the adaptive filter 48 are selected such that the impulse response $$\hat{\underline{h}}[k]$$

of the adaptive filter is equal to the impulse response $\underline{h}$ 46 of the hybrid circuit, then the value of the difference signal e[k] on the line 50 will be zero in the absence of near end input sequence n[k]. Accordingly, the adaptive filter 48 adapts its tap weights to drive the value of the difference signal e[k] on the line 50 to a minimum/optimum value (e.g., preferably zero).

Figure 3:
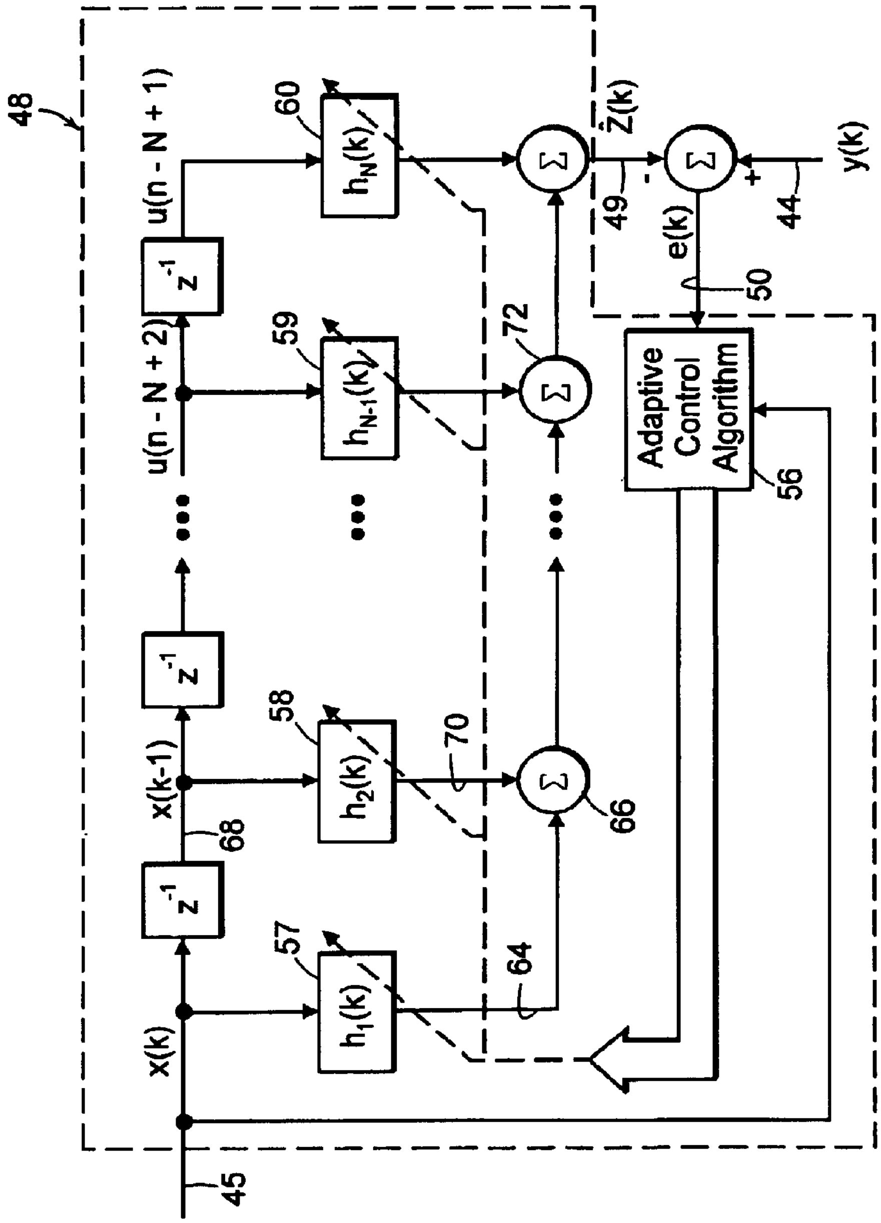
FIG. 3 is a block diagram illustration of an adaptive filter used within the echo canceller of FIG. 2.

FIG. 3 is a block diagram illustration of the adaptive filter 48 used within the echo canceller of FIG. 2. The adaptive filter 48 includes an adaptive control algorithm 56 that receives the difference signal e[k] on the line 50 and computes a value for each of the N coefficients $\hat{h}_i[k]$ 57–60. The adaptive filter receives the far end signal sequence $\underline{x}[k]$ on the line 45 which is multiplied by first coefficients $\hat{h}_1[k]$ 57, and the resultant product on a line 64 is input to a summer 66. The far end signal sequence x[k] on the line 45 is also input to the adaptive control algorithm 56. Similarly, a delayed version of the far end signal sequence x[k−1] on a line 68 is multiplied by second coefficients $\hat{h}_2$ [k] 58, and the resultant product on line 70 is also input to the summer 72. The product from each of the tap weights (e.g., 59, 60) is summed to generate the estimated echo signal $\hat{z}[k]$ on the line 49. Details of the adaptive control algorithm 56 shall now be discussed.

Figure 4:
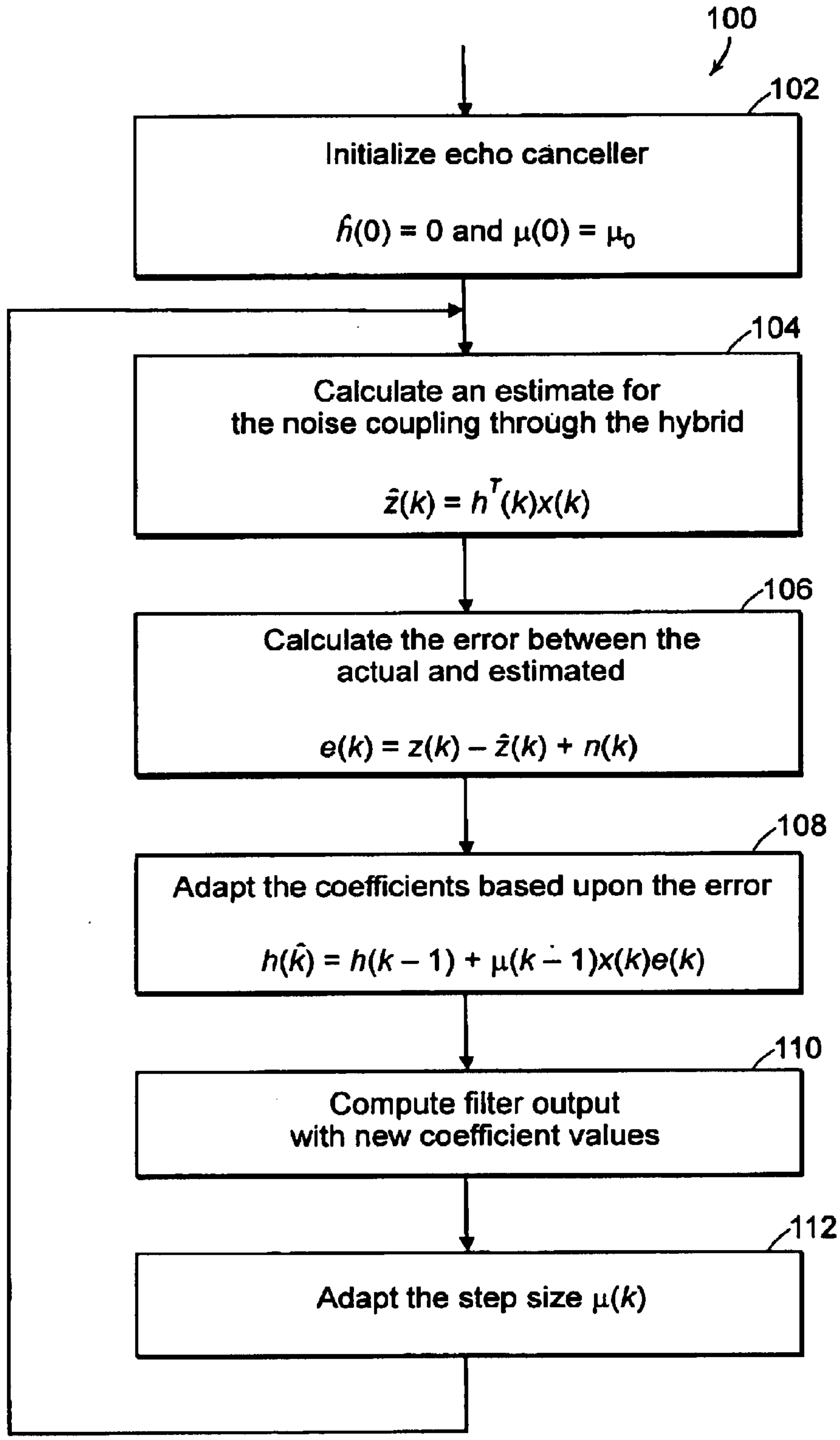
FIG. 4 is a flow chart illustration of processing steps performed by the adaptive filter of FIG. 3.

FIG. 4 is a flow chart illustration of processing steps 100 performed by the adaptive filter of FIG. 3. A first step 102 involves initializing the echo canceller, including setting the estimated impulse value at time k=0 to zero $$\left(\text{i, e., } \hat{\underline{h}}[0]-0\right)$$

and setting the step size value at time k=0 to an initial value (i.e., $\underline{\mu}[0]=\mu_0$). In addition, the vector ϕ at k=0 is also set to an initial value of zero (i.e., $\underline{\phi}[0]=0$). The details of the vector $\underline{\phi}[k]$ shall be presented hereinafter. The value of the initial step size $\mu_0$ can be selected by analyzing the transient behavior of the mean squared error of the LMS algorithm. From this analysis it is known that the step-size requirements for speed of convergence and steady state residual error are opposed. A large step-size will result in a fast speed of convergence but will render a high residual error, and conversely a small step-size would result in opposite behavior. Typically, in communication system applications the echo canceller requires a fast speed of convergence and a low residual error. A fixed step-size can not satisfy both requirements at once, therefore it is desirable to use a dynamically adjustable step-size. It is also known, that the step-size must be bounded to ensure algorithm stability. In this application, the initial step-size value would be chosen relatively large such that it achieves a fast speed of convergence, but of course within the stability boundaries. Step 104 is then performed to compute the estimated echo signal $\hat{z}[k]$. The estimate $\hat{z}[k]$ can be computed using the expression:

$$z[k]=\underline{h}_0{}^T[k]\underline{x}[k] \qquad \text{EQ. 1}$$

Step 106 is performed next to compute the difference signal e[k] using the following expression:

$$e[k]=y[k]-\hat{z}[k]=\underline{h}_0^T[k]\underline{x}[k]+n[k]-\hat{\underline{h}}^T[k]\underline{x}[k] \qquad \text{EQ. 2}$$

Step 108 then computes new filter coefficient values. Specifically, the estimated impulse response is computed as follows:

$$\hat{\underline{h}}[k+1]=\hat{\underline{h}}[k]+\underline{\mu}[k]\cdot\underline{x}[k]e[k] \qquad \text{EQ. 3}$$

where:

$\underline{\mu}[k]$ is the past value of the step size vector.

Notably, the estimated impulse response $$\hat{\underline{h}}[k]$$

is preferably a function of the step size vector $\underline{\mu}[k]$, the input signal $\underline{x}[k]$ and the difference signal e[k]. As discussed above, selecting the value of the step size $\underline{\mu}[k]$ has classically involved a tradeoff between convergence speed and steady state error. According to an aspect of the present invention, step 112 is performed next to compute the dynamically adjustable step size vector $\underline{\mu}[k]$. Of course the step size value must always be in a range so the filter remains stable.

Step 112 computes vector $\underline{\phi}[k]$ using the following expression:

$$\underline{\phi}[k+1]=\underline{\phi}[k]\bullet(\underline{1}-\underline{\mu}[k]\bullet\underline{x}^2[k])+e[k]\underline{x}[k] \qquad \text{EQ. 4}$$

The vector $\underline{\phi}[k]$ denotes the gradient of the i$^{th}$ element of the coefficient vector $$\hat{\underline{h}}[k]$$

with respect to the i$^{th}$ element of step size vector $\underline{\mu}[k]$. Step 112 then computes a new value for the step size $\mu$, using the following equation:

$$\underline{\mu}[k+1] = \underline{\mu}[k] + \alpha\underline{\phi}[k]\cdot\underline{x}[k]e[k]\,|_{\mu_{\min}}^{\mu_{\max}} \quad \text{EQ. 5}$$

where,

α is a small positive scalar constant value.

Significantly, the present invention provides a computationally efficient technique for dynamically adjusting the step size with adaptive filter, with good speed of convergence.

In an alternative embodiment, it is contemplated that the step size $\mu[k]$ may be adaptively computed using an open loop computation that does not use the error sequence e[k], nor the input signal. The step size is then computed using the following equation:

$$\mu[k+1] = \mu[k] + \xi[k] \quad \text{EQ. 6}$$

where $\xi[k]$ is an empirically derived set of values.

The echo canceller may be implemented in a DSP, an ASIC, or a general purpose processor.

Although the present invention has been shown and described with respect to several preferred embodiments thereof, various changes, omissions and additions to the form and detail thereof, may be made therein, without departing from the spirit and scope of the invention.

What is claimed is:

1. An echo canceller adapted for use in a communication system that includes a hybrid circuit, said echo canceller comprising:

an adaptive digital filter that generates an estimated echo signal $\hat{z}[k]$ in response to (i) a sampled input data sequence x[k] and (ii) an error signal sequence e[k] indicative of the difference between a near end signal sequence y[k] and the estimated echo signal $\hat{z}[k]$, wherein said adaptive digital filter computes filter coefficients based upon said error signal sequence e[k] using a stochastic quadratic descent estimator that employs a dynamically adjustable step size vector $\underline{\mu}[k]$ and said adaptive digital filter comprises means for computing said dynamically adjustable step size vector $\underline{\mu}[k]$ of the form $$\underline{\mu}[k+1] = \underline{\mu}[k] + \alpha\,\underline{\phi}[k]\cdot\underline{x}[k]e[k]\,|_{\mu_{\min}}^{\mu_{\max}},$$

where $\underline{\phi}[k+1]=\underline{\phi}[k]\bullet(\underline{1}-\underline{\mu}[k]\bullet\underline{x}^2[k])+e[k]\underline{x}[k]$ and α is a scalar.

2. The echo canceller of claim 1, wherein said stochastic quadratic descent estimator comprises a least mean square (LMS) estimator that includes said dynamically adjustable step size.

3. An integrated circuit that includes an echo canceller adapted for use in a communication system that includes a hybrid circuit that provides a return signal, said echo canceller comprising:

an adaptive digital filter that generates an estimated echo signal $\hat{z}[k]$ in response to (i) a sampled input data sequence x[k] and (ii) an error signal sequence e[k] indicative of the difference between a near end signal sequence y[k] and the estimated echo signal $\hat{z}[k]$, wherein said adaptive digital filter computes filter coefficients based upon said error signal sequence e[k] using a stochastic quadratic descent estimator that employs a dynamically adjustable step size vector $\underline{\mu}[k]$ and said adaptive digital filter comprises means for computing said dynamically adjustable step size vector $\underline{\mu}[k]$ of the form $$\underline{\mu}[k+1] = \underline{\mu}[k] + \alpha\,\underline{\phi}[k]\cdot\underline{x}[k]e[k]\,|_{\mu_{\min}}^{\mu_{\max}},$$

where $\underline{\phi}[k+1]=\underline{\phi}[k]\bullet(\underline{1}-\underline{\mu}[k]\bullet\underline{x}^2[k])+e[k]\underline{x}[k]$ and α is a scalar.

4. The integrated circuit of claim 3, wherein said stochastic quadratic descent estimator comprises a least mean square (LMS) estimator that includes said dynamically adjustable step size.

5. A digital signal processor that includes executable program instructions to provide an echo canceller adapted for use in a communication system which includes a hybrid circuit that provides a return signal, said echo canceller comprising:

an adaptive digital filter that generates an estimated echo signal $\hat{z}[k]$ in response to (i) a sampled input data sequence x[k] and (ii) an error signal sequence e[k] indicative of the difference between a near end signal sequence y[k] and the estimated echo signal $\hat{z}[k]$, wherein said adaptive digital filter computes filter coefficients based upon said error signal sequence e[k] using a stochastic quadratic descent estimator that employs a dynamically adjustable step size vector $\underline{\mu}[k]$ and said adaptive digital filter comprises means for computing said dynamically adjustable step size vector $\underline{\mu}[k]$ of the form $$\underline{\mu}[k+1] = \underline{\mu}[k] + \alpha\underline{\phi}[k]\cdot\underline{x}[k]e[k]\,|_{\mu_{\min}}^{\mu_{\max}},$$

where $\underline{\phi}[k+1]=\underline{\phi}[k]\bullet(\underline{1}-\underline{\mu}[k]\bullet\underline{x}^2[k])+e[k]\underline{x}[k]$ and α is a scalar.

* * * * *